US012720385B2

(12) United States Patent
Tao et al.

(10) Patent No.: US 12,720,385 B2
(45) Date of Patent: Aug. 25, 2026

(54) DEVICE IDENTIFICATION METHOD, AND TERMINAL DEVICE PROCESSING METHOD, APPARATUS, AND SYSTEM

(71) Applicant: Huawei Technologies Co., Ltd., Shenzhen (CN)

(72) Inventors: Liang Tao, Nanjing (CN); Dewei Bao, Nanjing (CN); Changlu Li, Nanjing (CN); Lv Ding, Nanjing (CN); Wenlu Zhao, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 276 days.

(21) Appl. No.: 18/400,541

(22) Filed: Dec. 29, 2023

(65) Prior Publication Data

US 2024/0137825 A1 Apr. 25, 2024
US 2024/0236791 A9 Jul. 11, 2024

Related U.S. Application Data

(63) Continuation of application No. PCT/CN2022/075742, filed on Feb. 10, 2022.

(30) Foreign Application Priority Data

Jun. 30, 2021 (CN) ........................ 202110745190.X

(51) Int. Cl.
*H04W 76/30* (2018.01)
*H04W 36/00* (2009.01)
*H04W 84/12* (2009.01)

(52) U.S. Cl.
CPC ......... *H04W 36/033* (2023.05); *H04W 76/30* (2018.02); *H04W 84/12* (2013.01)

(58) Field of Classification Search
None
See application file for complete search history.

(56) References Cited

U.S. PATENT DOCUMENTS 10,548,157 B2 * 1/2020 Zhang .................. H04W 72/51
2011/0194442 A1 8/2011 Narasimhan
(Continued)

FOREIGN PATENT DOCUMENTS

CN 105589506 A 5/2016
CN 107113639 A 8/2017
(Continued)

OTHER PUBLICATIONS

Aruba, "Cellular Handoff Assist", URL: https://www.arubanetworks.com/techdocs/ArubaOS_86_Web_Help/Content/arubaos-solutions/arm/cell-hnff-asst.htm, Hewlett Packard Enterprise Company, 1 page, printed Nov. 3, 2024.

*Primary Examiner* — Jay P Patel
(74) *Attorney, Agent, or Firm* — Slater Matsil, LLP

(57) ABSTRACT

In accordance with an embodiment, a device identification method includes: obtaining historical connection data of the second device belonging to a wireless local area network (WLAN), where the historical connection data reflects a connection status between each of at least one terminal device that used to be connected to the second device and the WLAN; and determining the second device as an edge wireless access point (AP) device based on off-net terminal device data of the second device.

20 Claims, 5 Drawing Sheets

(56) References Cited

U.S. PATENT DOCUMENTS

| | | | | |
|---|---|---|---|---|
| 2017/0048879 | A1* | 2/2017 | Zhang | H04W 76/27 |
| 2017/0373883 | A1* | 12/2017 | Guo | H04L 12/4633 |
| 2018/0124631 | A1* | 5/2018 | Ramos de Azevedo | H04W 64/006 |
| 2018/0152881 | A1* | 5/2018 | Tipton | H04W 76/11 |
| 2020/0389781 | A1* | 12/2020 | Henry | H04W 84/12 |
| 2021/0204175 | A1* | 7/2021 | Rangaraju | H04W 12/037 |
| 2022/0039694 | A1* | 2/2022 | Pronk | A61B 5/0015 |
| 2022/0182864 | A1 | 6/2022 | Li et al. | |
| 2022/0408271 | A1* | 12/2022 | Phillippe | H04W 48/20 |

FOREIGN PATENT DOCUMENTS

| | | | | |
|---|---|---|---|---|
| CN | 103874216 | B * | 9/2017 | |
| CN | 115510929 | A * | 12/2022 | G06N 20/00 |
| WO | 2018040109 | A1 | 3/2018 | |
| WO | 2021043146 | A1 | 3/2021 | |

* cited by examiner

DEVICE IDENTIFICATION METHOD, AND TERMINAL DEVICE PROCESSING METHOD, APPARATUS, AND SYSTEM

CROSS-REFERENCE TO RELATED APPLICATIONS

This application is a continuation of International Application No. PCT/CN2022/075742, filed on Feb. 10, 2022, which claims priority to Chinese Patent Application No. 202110745190.X, filed on Jun. 30, 2021. The disclosures of the aforementioned applications are hereby incorporated by reference in their entireties.

TECHNICAL FIELD

This application relates to the field of communications technologies, and in particular, to a device identification method, and a terminal device processing method, apparatus, and system.

BACKGROUND

A terminal device may access a wireless local area network (WLAN) through a wireless access point (AP) device, so that the WLAN provides the terminal device with network services required by the terminal device. When the terminal device enters coverage of the WLAN, the terminal device may establish a connection to any AP device in the WLAN. When the terminal device moves away from the coverage of the WLAN, signal strength between the terminal device and the connected AP device becomes increasingly weak, and eventually the terminal device disconnects from the AP device. By that time, the terminal device disconnects from the WLAN. The behavior that the terminal device disconnects from the WLAN is referred to as going off-net, and a terminal device that performs the behavior of going off-net is referred to as an off-net terminal device.

If the signal strength between the off-net terminal device and the AP device is weak before the terminal device goes off-net, a network signal of the off-net terminal device may be unstable, affecting user experience of the off-net terminal device. For example, a packet loss rate before the off-net terminal device goes off-net may be high. As a result, data received by the terminal device is incomplete. Therefore, generally, the AP device may control the terminal device to actively go off-net. During specific implementation, the AP device may determine whether the signal strength between the AP device and the terminal device is less than a threshold for a long time. If the signal strength between the AP device and the terminal device is less than the threshold for a long time, the AP device may control the terminal device to actively disconnect from the AP device, to trigger the terminal device to switch from the WLAN to a mobile network, so that the terminal device can be switched to the mobile network with better network signals before network signals of the WLAN deteriorate.

However, in this off-net method, it is difficult to accurately determine, from a plurality of terminal devices, a terminal device that is to go off-net. For example, in a process in which a terminal device is switched from one AP device to another AP device, the AP device may consider the terminal device as a terminal device with an unstable signal, and as a result the terminal device is disconnected from a WLAN. In this case, the terminal device that does not need to be switched to a mobile network is forcibly switched to the mobile network, and user experience is reduced.

SUMMARY

Embodiments of this application provide a device identification method, and a terminal device processing method, apparatus, and system, to accurately determine a terminal device that is to be disconnected in advance.

According to a first aspect, an embodiment of this application provides a terminal device processing system. The system includes a first device and a second device, and the second device belongs to a WLAN. Optionally, the WLAN may also include one or more second devices. The first device may be configured to obtain historical connection data of the second device, where the historical connection data reflects a connection status of each terminal device in at least one terminal device that used to be connected to the second device. Next, the first device may determine the second device as an edge AP device based on off-net terminal device data of the second device. The off-net terminal device data of the second device may include a quantity and/or a ratio of off-net terminal devices of the second device. The off-net terminal device of the second device is a terminal device off-net from the second device. That is, the off-net terminal device of the second device does not establish a connection to the WLAN in a first time interval after being disconnected from the second device. After being determined as the edge AP device, the second device may disconnect from a target terminal device, where the target terminal device is a terminal device that is in a state of being away from the second device and located at a coverage edge of the WLAN, in at least one terminal device connected to the second device. In this way, if the terminal device goes off-net through the second device within a time period corresponding to the historical connection data, the first device may determine the second device as the edge AP device. In other words, the second device is an AP device deployed at the edge of the WLAN, and the terminal device may leave entire signal coverage of the WLAN by leaving signal coverage of the edge AP device. In a same WLAN system, there is no off-net terminal device or a small quantity of off-net terminal devices in another second device except the edge AP device. Therefore, after determining the second device as the edge AP device, the second device controls the target terminal device to go off-net, so that a terminal device that does not need to go off-net can be prevented from being identified as a terminal device that needs to go off-net. In this way, accuracy of identifying the target terminal device is improved.

Optionally, the off-net terminal device data may include a quantity of off-net terminal devices and/or a ratio of off-net terminal devices. In this case, the first device may determine the second device as the edge AP device in the following three implementations.

In a first specific implementation, the off-net terminal device data includes the quantity of off-net terminal devices. In this case, the first device may compare the quantity of off-net terminal devices of the second device with a threshold quantity of off-net terminal devices. If the quantity of off-net terminal devices of the second device is greater than or equal to the threshold quantity of off-net terminal devices, the first device may determine the second device as the edge AP device.

In a second specific implementation, the off-net terminal device data includes the ratio of off-net terminal devices. In this case, the first device may compare the ratio of off-net terminal devices of the second device with a threshold ratio of off-net terminal devices. If the ratio of off-net terminal devices of the second device is greater than or equal to the threshold ratio of off-net terminal devices, the first device may determine the second device as the edge AP device.

In a third specific implementation, the off-net terminal device data includes the quantity of off-net terminal devices and the ratio of off-net terminal devices. In this case, the first device may compare the ratio of off-net terminal devices of the second device with a threshold ratio of off-net terminal devices, and compare the quantity of off-net terminal devices of the second device with a threshold quantity of off-net terminal devices. If the ratio of off-net terminal devices of the second device is greater than or equal to the threshold ratio of off-net terminal devices, and the quantity of off-net terminal devices of the second device is greater than or equal to the threshold quantity of off-net terminal devices, the first device may determine the second device as the edge AP device.

Optionally, the ratio of off-net terminal devices of the second device may be a ratio of the quantity of off-net terminal devices of the second device to a quantity of first-type terminal devices of the second device, or may be a ratio of the quantity of off-net terminal devices of the second device to a quantity of second-type terminal devices of the second device. The first-type terminal device is a terminal device that disconnects from the second device. The second-type terminal device is a terminal device that is in the first-type terminal devices and that is not an off-net terminal device. The quantity of second-type terminal devices is a quantity obtain by subtracting the quantity of off-net terminal devices of the second device from the quantity of first-type terminal devices.

Optionally, the target terminal device may be first determined from one or more terminal devices connected to the second device, and then disconnected. The target terminal device may be determined in the following two implementations.

In a first specific implementation, the target terminal device may be determined by the second device. Specifically, after the first device determines the second device as the edge AP device, the second device may obtain connection data of the second device, and determine the target terminal device based on the connection data.

Optionally, the second device may determine, based on a movement status of a terminal device, whether the terminal device is the target terminal device. Specifically, in a process of determining whether a first terminal device is the target terminal device, the second device may first determine a movement status of the first terminal device based on signal strength of a connection between the first terminal device and the second device in a second time interval. Next, the second device may determine whether the movement status of the first terminal device meets a first condition. If the movement status of the first terminal device meets the first condition, the second device may determine the first terminal device as the target terminal device; or if the movement status of the first terminal device does not meet the first condition, the second device may determine the first terminal device as a non-target terminal device. The first condition includes that after the first terminal device is connected to the second device, a distance between the first terminal device and the second device presents a change trend of decreasing first and then increasing.

Optionally, when determining the movement status of the first terminal device, the second device may determine the movement status of the first terminal device based on the signal strength using a movement status identification model. The movement status identification model is a machine learning model, and may be determined by the first device and sent to the second device, or may be pre-deployed in the second device.

Optionally, the first device includes a network management device or a wireless controller, and the second device includes a wireless access point AP device or a network device supporting an AP function.

According to a second aspect, an embodiment of this application provides a device identification method. The method may be performed by a first device in the foregoing terminal device processing system. When performing the device identification method provided in this embodiment of this application, historical connection data of a second device may be first obtained. The historical connection data reflects a connection status between each terminal device in at least one terminal device that used to be connected to the second device and a WLAN. Next, the second device may be determined as an edge AP device based on off-net terminal device data of the second device. The off-net terminal device data of the second device includes a quantity and/or a ratio of off-net terminal devices of the second device. The off-net terminal device of the second device is a terminal device that remains in a disconnected state in a first time interval after being disconnected from the second device and that is not connected to another network device in the WLAN except the second device, in the at least one terminal device that used to be connected to the second device.

Optionally, if the quantity of off-net terminal devices of the second device is greater than or equal to a threshold quantity of off-net terminal devices, the second device is determined as the edge AP device; or if the ratio of off-net terminal devices of the second device is greater than or equal to a threshold ratio of off-net terminal devices, the second device is determined as the edge AP.

Optionally, the ratio of off-net terminal devices of the second device is a ratio of the quantity of off-net terminal devices of the second device to a quantity of first-type terminal devices, or is a ratio of the quantity of off-net terminal devices of the second device to a quantity of second-type terminal devices, the first-type terminal device is a terminal device that disconnects from the second device, and the quantity of second-type terminal devices is a quantity obtained by subtracting the quantity of off-net terminal devices of the second device from the quantity of first-type terminal devices.

Optionally, the method further includes: determining a target terminal device based on a movement status of at least one terminal device connected to the second device; and disconnecting the second device from the target terminal device, where the target terminal device is a terminal device that is in a state of being away from the second device and located at a coverage edge of the WLAN, in the at least one terminal device connected to the second device.

Optionally, the determining a target terminal device based on a movement status of at least one terminal device connected to the second device includes: obtaining, based on a movement status identification model, the movement status of the at least one terminal device connected to the second device, where the movement status identification model is a machine learning model; and determining the target terminal device based on the movement status of the terminal device.

Optionally, the method is performed by the first device, the first device includes a network management device or a wireless controller, and the second device includes a wireless access point AP device or a network device supporting an AP function.

According to a third aspect, an embodiment of this application provides a device identification method. The method may be performed by a first device in the foregoing terminal device processing system. When performing the device identification method provided in this embodiment of this application, connection data of a second device may be first obtained. The connection data reflects signal strength of each terminal device in at least one terminal device connected to the second device. Next, it may be compared to determine whether signal strength of each terminal device in the at least one terminal device that used to be connected to the second device is less than or equal to a signal strength threshold. If the signal strength of the terminal device is less than or equal to the signal strength threshold, the terminal device may be determined as a target signal strength terminal device. The second device may be determined as the edge AP device based on a quantity of target signal strength terminal devices of the second device.

Optionally, the method further includes: determining a target terminal device based on a movement status of the at least one terminal device connected to the second device; and disconnecting the second device from the target terminal device, where the target terminal device is a terminal device that is to leave the second device and approach a coverage edge of the second device in the at least one terminal device connected to the second device.

Optionally, the determining a target terminal device based on a movement status of the at least one terminal device connected to the second device includes: obtaining, based on a movement status identification model, the movement status of the at least one terminal device connected to the second device, where the movement status identification model is a machine learning model; and determining the target terminal device based on the movement status of the terminal device.

Optionally, the method is performed by the first device, the first device includes a network management device or a wireless controller, and the second device includes a wireless access point AP device or a network device supporting an AP function.

According to a fourth aspect, an embodiment of this application provides a terminal device processing method. The method may be performed by a second device in the foregoing terminal device processing system. When performing the terminal device processing method provided in this embodiment of this application, the second device may first receive an indication message. The indication message is generated and sent to the second device by a first device after determining the second device as an edge AP device. After receiving the indication message, the second device may determine, based on the indication message, a target terminal device from at least one terminal device connected to the second device, and disconnect from the target terminal device.

Optionally, that the second device determines a target terminal device from at least one terminal device connected to the second device includes: The second device obtains connection data of the second device. The connection data reflects a connection status of each terminal device in the at least one terminal device connected to the second device. The second device determines the target terminal device based on the connection data.

Optionally, the at least one terminal device connected to the second device includes a first terminal device. Connection data of the first terminal device includes signal strength of a connection between the first terminal device and the second device. That the second device determines the target terminal device based on the connection data includes: The second device determines a movement status of the first terminal device based on signal strength of a connection between the first terminal device and the second device in a first time interval. If the movement status of the first terminal device meets a first condition, the second device determines the first terminal device as the target terminal device. The first condition includes that after the first terminal device is connected to the second device, a distance between the first terminal device and the second device presents a change trend of decreasing first and then increasing.

Optionally, that the second device determines a movement status of the first terminal device based on signal strength of a connection between the first terminal device and the second device within a first time interval includes: The second device determines the movement status of the first terminal device based on the signal strength using a movement status identification model, where the movement status identification model is a machine learning model.

Optionally, the connection data further includes connection duration between the terminal device and the second device. Before the determining the first terminal device as the target terminal device, the method further includes: The second device determines that the connection duration meets a second condition, where the second condition includes that the connection duration is greater than or equal to a preset time threshold.

According to a fifth aspect, an embodiment of this application provides a device identification apparatus, including a connection data obtaining module and an edge wireless access point AP determining module. The connection data obtaining module is configured to obtain historical connection data of a second device, where the historical connection data reflects a connection status between each terminal device in at least one terminal device that used to be connected to the second device and a WLAN, and the second device belongs to the wireless local area network WLAN. The edge wireless access point AP determining module is configured to determine the second device as an edge AP device based on off-net terminal device data of the second device, where the off-net terminal device data of the second device includes a quantity and/or a ratio of off-net terminal devices of the second device, and the off-net terminal device of the second device is a terminal device that remains in a disconnected state in a first time interval after being disconnected from the second device and that is not connected to another network device in the WLAN except the second device, in the at least one terminal device that used to be connected to the second device.

Optionally, the apparatus further includes: a target terminal device determining module, configured to determine a target terminal device based on a movement status of at least one terminal device connected to the second device; and a target terminal device processing module, configured to disconnect the target terminal device from the second device, where the target terminal device is a terminal device that is in a state of being away from the second device and located at a coverage edge of the WLAN, in the at least one terminal device connected to the second device.

According to a sixth aspect, an embodiment of this application provides a device identification apparatus, where the apparatus includes: a connection data obtaining module, configured to obtain connection data of a second device, where the connection data reflects signal strength of each terminal device in at least one terminal device connected to the second device, and the second device belongs to a wireless local area network WLAN; and an edge wireless access point AP determining module, configured to determine the second device as an edge AP device based on a quantity of target signal strength terminal devices of the second device, where the target signal strength terminal device of the second device is a terminal device whose signal strength is less than or equal to a signal strength threshold in the at least one terminal device connected to the second device.

Optionally, the apparatus further includes: a target terminal device determining module, configured to determine a target terminal device based on a movement status of the at least one terminal device connected to the second device; and a target terminal device processing module, configured to disconnect the target terminal device from the second device, where the target terminal device is a terminal device that is in a state of being away from the second device and located at a coverage edge of the WLAN, in the at least one terminal device connected to the second device.

According to a seventh aspect, an embodiment of this application provides a terminal device processing apparatus, where the apparatus belongs to a wireless local area network WLAN, and the apparatus includes: a receiving module, configured to receive an indication message, where the indication message indicates that the apparatus is an edge wireless access point AP device; a target terminal device determining module, configured to determine a target terminal device from at least one terminal device connected to the apparatus, where the target terminal device is a terminal device that is in a state of being away from a second device and located at a coverage edge of the WLAN, in the at least one terminal device connected to the apparatus; and a target terminal device processing module, configured to disconnect the target terminal device from the apparatus.

Optionally, that the target terminal device determining module is configured to determine a target terminal device from at least one terminal device connected to the apparatus includes: The target terminal device determining module obtains connection data of the apparatus. The connection data reflects a connection status of each terminal device in the at least one terminal device connected to the apparatus. The target terminal device determining module determines the target terminal device based on the connection data.

According to an eighth aspect, an embodiment of this application provides a terminal device processing system, where the system includes a first device and a second device. The first device implements the device identification method according to any one of the second aspect, or implements the device identification method according to any one of the third aspect. The second device implements the terminal device processing method according to any one of the fourth aspect.

According to a ninth aspect, an embodiment of this application provides a processing apparatus, including a processor and a memory. The memory is configured to store a computer program. The processor is configured to execute the computer program stored in the memory, to enable the apparatus to perform the method according to any one of the second aspect, or perform the method according to any one of the third aspect, or perform the method according to any one of the fourth aspect.

According to a tenth aspect, an embodiment of this application provides a computer-readable storage medium. The computer-readable storage medium stores a computer program, and when the computer program is executed by a processor, the method according to any one of the second aspect is implemented, or the method according to any one of the third aspect is implemented, or the method according to any one of the fourth aspect is implemented.

According to an eleventh aspect, an embodiment of this application provides a computer program product. The computer program product includes a program or code, and when the program or the code is run on a computer, the method according to any one of the second aspect is implemented, or the method according to any one of the third aspect is implemented, or the method according to any one of the fourth aspect is implemented.

DETAILED DESCRIPTION OF THE EMBODIMENTS

With reference to the accompanying drawings, a conventional technology and a device identification method, and a terminal device processing method, apparatus, and system provided in embodiments of this application are described.

A terminal device can access a WLAN through an AP device. When coverage of the WLAN is large, a WLAN system may provide the terminal device with, through a plurality of AP devices, network services required by the terminal device. For example, the plurality of AP devices may be deployed at different locations within the coverage of the WLAN. In this way, the terminal device establishes a connection to any AP device in the plurality of AP devices, and may access the WLAN network through the AP device. When the terminal device moves within the coverage of the WLAN, the terminal device may switch the connected AP device, so that the terminal device is always connected to an AP device with strongest signals.

Figure 1:
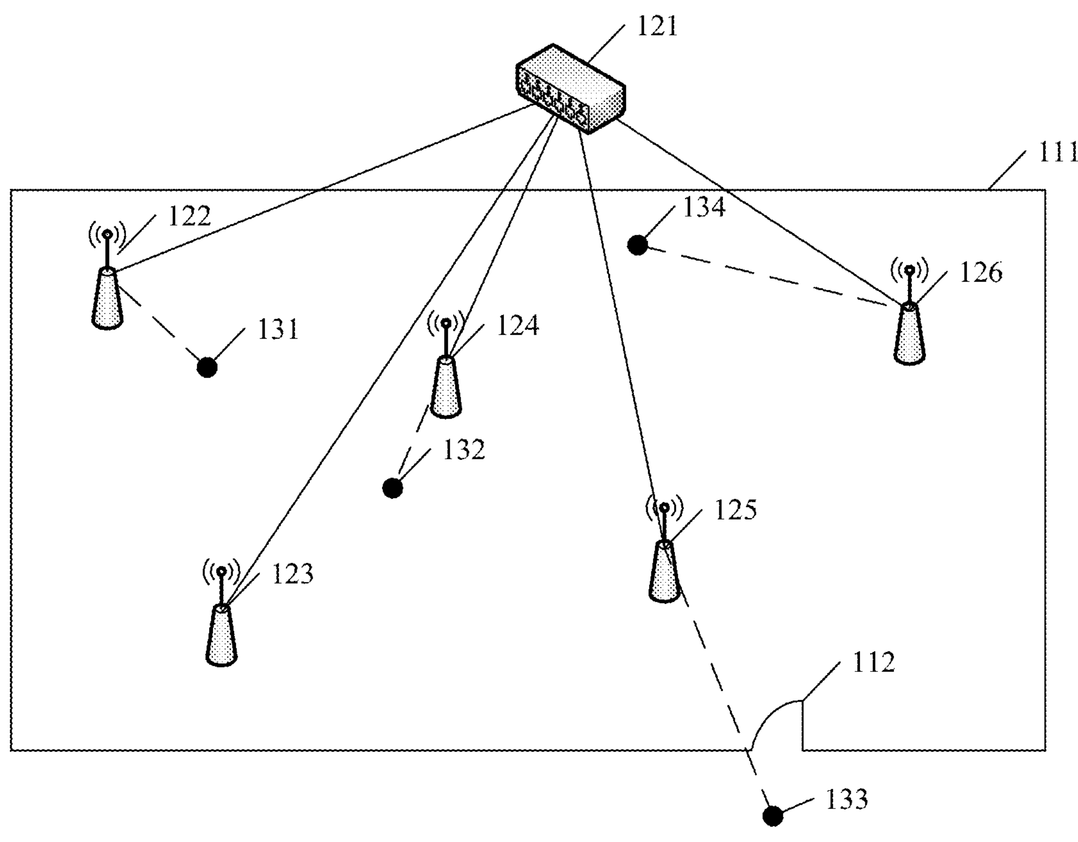
FIG. 1 is a schematic diagram of a deployment manner of a WLAN system according to an embodiment of this application.

FIG. 1 is a schematic diagram of an application scenario of a WLAN system according to an embodiment of this application. In the embodiment shown in FIG. 1, an area 111 may be entered and exited through entrance and exit 112, and a WLAN is deployed in the area in. The WLAN system may include a wireless controller 121, an AP device 122, an AP device 123, an AP device 124, an AP device 125, and an AP device 126. The wireless controller 121 is separately connected to the AP device 122, the AP device 123, the AP device 124, the AP device 125, and the AP device 126, so that the AP device 122, the AP device 123, the AP device 124, the AP device 125, and the AP device 126 belong to a same WLAN network.

When a terminal device moves within signal coverage of the WLAN, the terminal device may establish a connection to any AP in a plurality of APs, so that the WLAN provides the terminal device with network services required by the terminal device. For example, if a terminal device A is located at a location 131 in FIG. 1, the terminal device A is closest to the AP device 122, and the terminal device A may establish a connection to the AP device 122, to access the WLAN through the AP device 122. In a process in which the terminal device A moves from the location 131 to a location 132, because a distance between the terminal device A and the AP device 124 is short, and a distance between the terminal device A and the AP device 122 is long, signal strength between the terminal device A and the AP device 124 may be stronger than signal strength between the terminal device A and the AP device 122. In this case, the terminal device A may disconnect from the AP device 122, establish a connection to the AP device 124, and access the WLAN through the AP device 124.

In a process in which a terminal device goes off-net, signal strength between the terminal device and an AP device at a coverage edge of a WLAN becomes increasingly weak. For example, if the terminal device A leaves the signal coverage of the WLAN, for example, leaving the area 111 through the entrance and exit 112 and moving to a location 133, a distance between the terminal device A and the AP device 125 is long, and signal strength of a connection between the terminal device A and the WLAN is weakened. During a period of weak signal strength, network service quality of the terminal device is poor, affecting user experience of the terminal device.

To resolve this problem, the AP device may generally determine whether the terminal device is a sticky terminal. If the terminal device is the sticky terminal, the AP device actively disconnects from the sticky terminal, adds a mobile terminal to a blocklist, and maintains the blocklist for a short time. The sticky terminal is a terminal device whose signal strength between the sticky terminal and the WLAN is less than a preset threshold within a preset time interval.

For example, the AP device 125 may determine whether a time for which signal strength between the AP device 125 and the terminal device A is less than a preset threshold is longer than a preset time interval. In this way, in a process in which the terminal device A moves to the location 133, if the signal strength between the terminal device A and the AP device 125 is less than the preset threshold within the preset time interval, it indicates that network service quality provided by the WLAN for the terminal device within the preset time interval is poor. In this way, before user experience of the terminal device A is affected, the AP device 125 may disconnect from the terminal device A, and the terminal device A does not access the WLAN again through the blocklist.

However, in the foregoing off-net method, the sticky terminal is determined only based on signal strength and connection duration between an AP device and a terminal device, and a terminal device that is to go off-net cannot be accurately found. For example, it is assumed that a terminal device B is located at a location 134 in FIG. 1. Because a distance between the location 134 and a nearest AP device (that is, the AP device 126) is still long, signal strength between the terminal device B and the AP device 126 may be lower than a preset threshold. In this case, if a time for which a user carrying the terminal device B stays at the location 134 exceeds a preset time interval, the AP device 126 disconnects from the terminal device B. However, the user may not intend to leave the WLAN, but stays at a location with low WLAN signal strength for a period of time, and the AP device is actively disconnected. In an actual application scenario, a signal in a small compartment is usually weak, but a user in the small compartment does not want to stop using a WLAN. Apparently, a terminal device that is to go off-net cannot be accurately found in a conventional off-net method, and user experience may be affected.

In addition, in the conventional off-net method, a network system or a device needs to first determine that a terminal device is a sticky terminal, and then disconnects from a network of the sticky terminal, to reduce impact of the sticky terminal on a WLAN network. The sticky terminal is a wireless terminal device with poor roaming initiative. A main symptom is as follows: The wireless terminal device always keeps associating with an AP that is initially associated with the wireless terminal device. Even if the terminal device is far away from the currently associated AP, has weak signals, and has a low rate, the terminal device still cannot roam to another neighboring AP with stronger signals. The network system or the device determines the sticky terminal based on signal strength between the terminal device and the AP device being less than a preset threshold within a preset time interval. However, within the preset time interval, a connection status between the terminal device and the AP device is already in a poor state, and a network service of the terminal device may be affected. It can be learned that in the conventional off-net method, the terminal device that is to go off-net cannot be accurately and quickly found, thereby affecting network service quality.

To resolve the foregoing problem, embodiments of this application provide a device identification method and a terminal device processing method, to avoid identifying a terminal device that does not need to go off-net as a terminal device that needs to go off-net.

Figure 2:
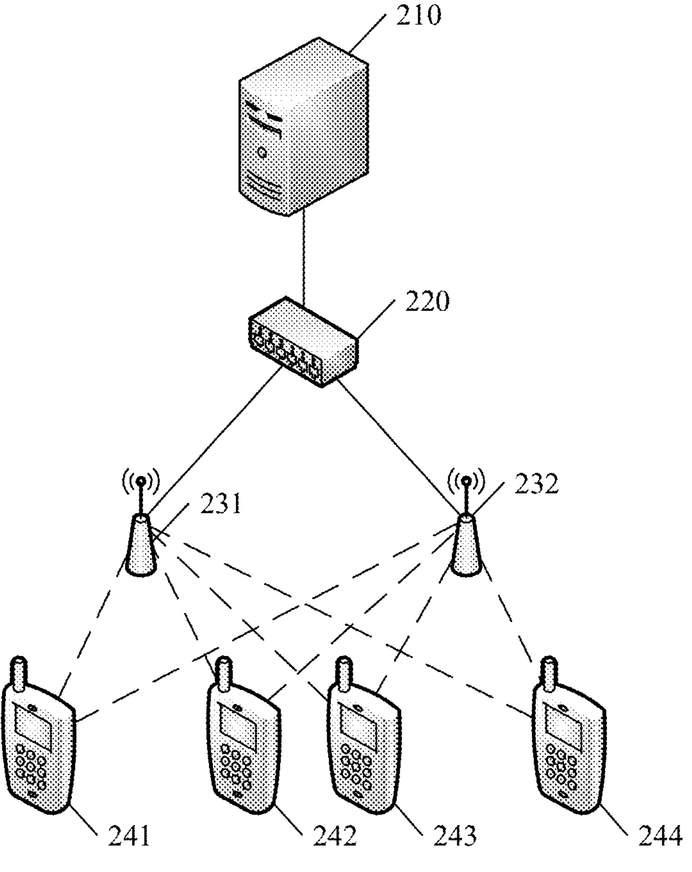
FIG. 2 is a schematic diagram of another structure of a WLAN system according to an embodiment of this application.

The device identification method and the terminal device processing method provided in embodiments of this application may be applied to a scenario shown in FIG. 2. In an embodiment shown in FIG. 2, a network management device 210, a wireless controller 220, an AP device 231, an AP device 232, a terminal device 241, a terminal device 242, a terminal device 243, and a terminal device 244 are included. The wireless controller 220 is separately connected to the network management device 210, the AP device 231, and the AP device 232.

The network management device 210, the wireless controller 220, the AP device 231, and the AP device 232 belong to a same WLAN system, and the terminal device 241, the terminal device 242, the terminal device 243, and the terminal device 244 may separately establish a wireless connection to the AP device 231, to access the WLAN through the AP device 231. In some specific implementations, the terminal device 241, the terminal device 242, the terminal device 243, and the terminal device 244 may further separately establish a wireless connection to the AP device 232, to access the WLAN through the AP device 232. In some specific implementations, one terminal device is connected to only one AP device at a time.

In some specific implementations, the network management device 210 in this embodiment of this application may control a plurality of AP devices in a same WLAN system in an area. The terminal device in this embodiment of this application may be a device that provides a user with voice and/or data connectivity, a handheld device with a wireless connection function, or another processing device connected to a wireless modem. For example, the terminal device may be a portable, pocket-sized, handheld, computer built-in, or vehicle-mounted mobile device, and exchanges voice and/or data with a wireless access network. For example, the terminal device may be a personal communication service (PCS) phone, a cordless phone, a session initiation protocol (SIP) phone, a wireless local loop (WLL) station, or a personal digital assistant (PDA). A wireless terminal may also be referred to as a system, a subscriber unit, a subscriber station, a mobile station, a mobile, a remote station, an access point, a remote terminal, an access terminal, a user terminal, a user agent, a user device, or a user equipment.

In some specific implementations, the network management device in this embodiment of this application may be an analyzer, for example, a campus analysis controller configured to analyze and manage a campus, or may be another data processing device having a computing, storage, and analysis capability, and is configured to manage a second device and/or a terminal device. In some specific implementations, the wireless controller in this embodiment of this application may be a wireless access controller (AC), or may be another device that has capabilities such as management, operation and maintenance, policy control, and data analysis on the terminal device, for example, an AP device that performs management and policy control. It should be noted that the wireless controller in this embodiment of this application may be deployed on a public cloud, a private cloud, or a local area network. The wireless controller may be an independent hardware device, or may be implemented by a functional module in an AP device.

It should be noted that in some specific implementations, the WLAN system may only include the wireless controller, and does not include the network management device. Correspondingly, actions performed by the analyzer in the method embodiment may be performed by the wireless controller. In some specific implementations, the WLAN system may include one wireless controller, or may include a plurality of wireless controllers. In some specific implementations, if the WLAN system includes a plurality of wireless controllers, different wireless controllers may be configured to control different AP devices.

Figure 3:
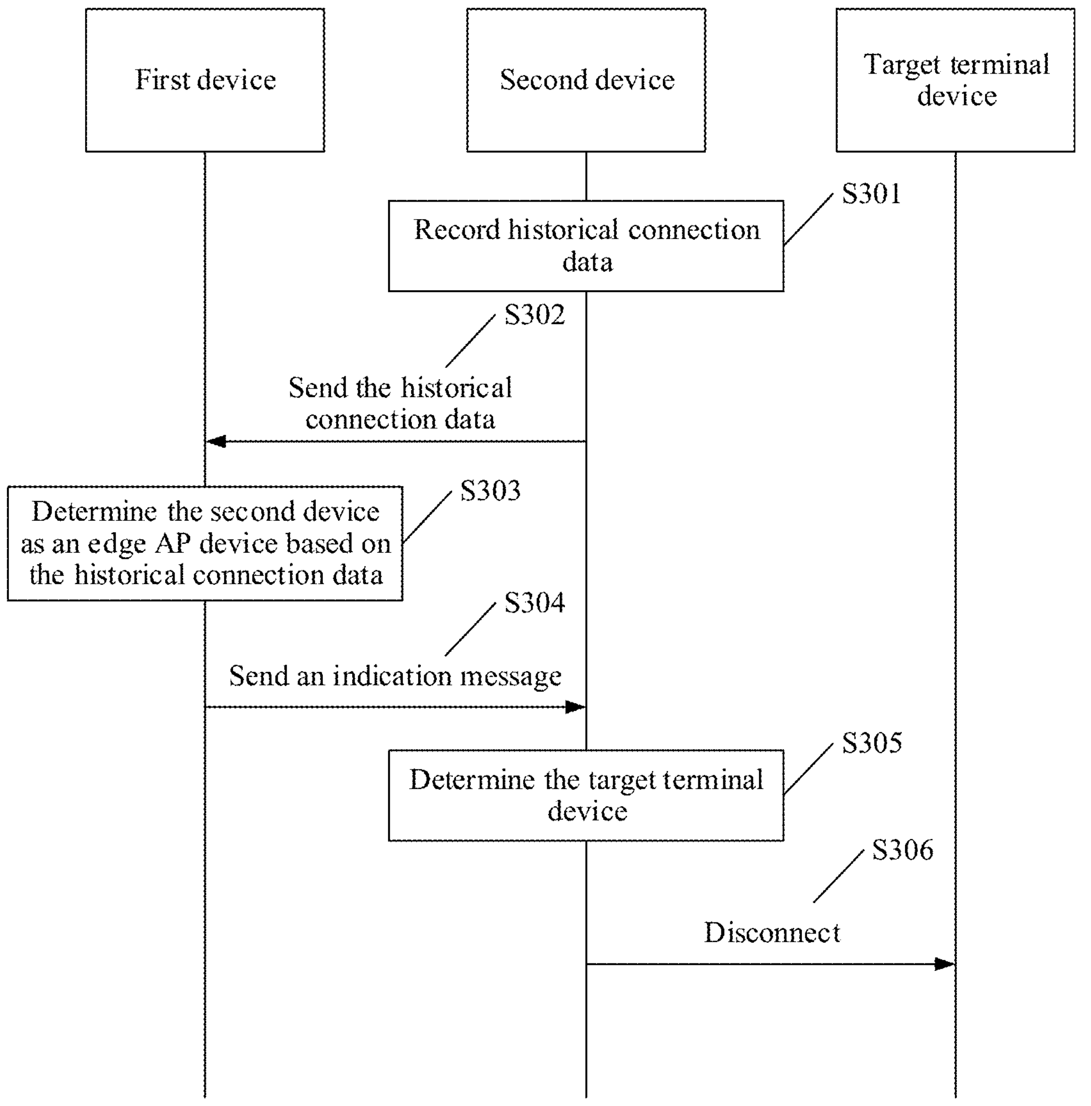
FIG. 3 is a signaling interaction diagram of a device identification method and a terminal device processing method according to an embodiment of this application.

FIG. 3 is a signaling interaction diagram of a device identification method and a terminal device processing method according to an embodiment of this application. The device identification method and the terminal device processing method provided in this embodiment of this application may include the following steps.

S301: A second device records historical connection data.

In this embodiment of this application, the second device may be, for example, an AP device, and may provide a WLAN access service for one or more terminal devices. In a process of providing a service for the terminal device, the second device may collect and record a connection status of each terminal device, to obtain the historical connection data. The historical connection data reflects a connection status of each terminal device in at least one terminal device that used to be connected to the second device. When the second device is connected to a plurality of terminal devices, connection data may include connection data of each terminal device in the plurality of terminal devices. Optionally, the historical connection data may include an identifier of the terminal device, and may further include any one or more of a time at which a connection between the terminal device and the second device is established, a time at which the terminal device is disconnected from the second device, a connection rate of the terminal device in a connected state, and signal strength of the terminal device in the connected state. For example, the following may be obtained through historical connection data of a terminal device A: description of a connection status of the terminal device A; the terminal device A with a terminal device identifier MAC A is connected to the second device in a time period from a time B to a time C; and connection rates and signal strength of the terminal device A at time points A1, A2, and A3 in a connected state.

An example is used for description. It is assumed that a terminal device B establishes a connection to a second device A at a first time. In this case, the second device A may record an identifier of the terminal device B, and record the first time as a time at which the connection between the terminal device B and the second device A is established. If the terminal device B disconnects from the second device A at a second time, the second device A may record the second time as a time at which the terminal device B is disconnected from the second device A. The identifier of the terminal device B uniquely identifies the terminal device B, and may be, for example, an identifier such as a device identifier and/or a media access control address (MAC) of the terminal device B.

In some specific implementations, connection data may include any one or more of data, for example, signal strength of a connection between a terminal device and a second device, a time at which the terminal device receives a data packet, a rate at which the terminal device receives the data packet, a rate at which the terminal device sends the data packet, a delay value at which the terminal device receives the data packet, and a packet loss rate of the terminal device. In this embodiment of this application, the connection data may be data that can reflect a connection status between the terminal device and the second device. Examples are not provided herein.

It can be learned from the foregoing descriptions that one WLAN system may include a plurality of second devices, and each second device in the plurality of second devices may record the connection data.

S302: The second device sends the historical connection data to a first device.

After obtaining the historical connection data, the second device may send the historical connection data to the first device. The first device may be a network management device, or may be a wireless controller. That is, the first device may be the network management device 210 in FIG. 1, or may be the wireless controller 220. In some specific implementations, if the second device is an AP device and the first device is a wireless controller, the first device may receive, through a connection to the second device, the historical connection data sent by the second device. If the second device is an AP device and the first device is a network management device, the second device may send the historical connection data to a wireless controller, and the wireless controller forwards the historical connection data to the first device. In a specific implementation, the second device may also send the connection data to a third device in real time, that is, the second device may send the connection data to the third device after obtaining the connection data, and the third device stores and analyzes the connection data. The third device may be a network management device (for example, the first device), a controller, or a memory in a network management system.

In some specific implementations, the second device may record the historical connection data every second time interval, and report the historical connection data to the first device after recording the historical connection data. In some other specific implementations, the second device may alternatively record the historical connection data once (or a limited number of times) after accessing a WLAN, and send the historical connection data to the first device.

It can be learned from the foregoing descriptions that one WLAN system may include a plurality of second devices, and each second device in the plurality of second devices may send the historical connection data to the first device.

In some embodiments, the second device sends the connection data to the first device in real time, and the first device stores and manages the connection data, to obtain the historical connection data.

S303: The first device determines the second device as an edge AP device based on the historical connection data.

The first device may determine, based on the historical connection data, whether the second device is the edge AP device. The edge AP device is an AP device with a high probability of a terminal device going off-net. After being disconnected from the edge AP device, a terminal device connected to the edge AP device goes off-net from the edge AP device, and a quantity of off-net terminal devices in the terminal devices disconnected from the edge AP device is great. For example, an off-net terminal device of the second device is a terminal device that is in at least one terminal device that used to be connected to the second device and that remains in a disconnected state in a first time interval after being disconnected from the second device. In this embodiment of this application, the terminal device off-net from the edge AP device is referred to as a target terminal device. In other words, after being disconnected from the edge AP device, the target terminal device no longer establishes a connection to the WLAN in the first time interval.

It can be learned from the foregoing descriptions that one WLAN system may include a plurality of second devices, and the first device may determine one by one whether each second device in the plurality of second devices is the edge AP device.

In this embodiment of this application, the first device may determine, based on off-net terminal device data of the second device, whether the second device is the edge AP device, or may determine, based on a quantity of target signal strength terminal devices of the second device, whether the second device is the edge AP device. A second device A is used as an example below to separately describe two methods for determining, by the first device, whether the second device is the edge AP device.

First, a method for determining, by the first device based on off-net terminal device data of the second device A, whether the second device A is the edge AP device is described.

The first device may first determine the off-net terminal device data of the second device A based on historical connection data of the second device A, and then determine, based on the off-net terminal device data of the second device A, whether the second device A is the edge AP device. The off-net terminal device data of the second device A is a quantity of off-net terminal devices of the second device A, and/or the off-net terminal device data of the second device A is a ratio of off-net terminal devices of the second device A.

In a first specific implementation, the off-net terminal device data of the second device A is the quantity of off-net terminal devices of the second device A. The off-net terminal device of the second device A is a terminal device off-net from the second device A. That is, the off-net terminal device of the second device A leaves a WLAN from the second device A.

The first device may first determine, from terminal devices that disconnect from the second device and based on historical connection data of the plurality of second devices, the terminal device that leaves the WLAN, and count the quantity of off-net terminal devices of the second device A. Next, the first device may determine, based on the quantity of off-net terminal devices of the second device A, whether the second device is the edge AP device. For description of how to determine the quantity of off-net terminal devices of the second device A, refer to the following description. Details are not described herein again.

Specifically, if the quantity of off-net terminal devices of the second device A is greater than or equal to a threshold quantity of off-net terminal devices, it indicates that a large quantity of terminal devices leave the WLAN from the second device A. In this case, the first device may determine the second device A as the edge AP device. If the quantity of off-net terminal devices of the second device A is less than the threshold quantity of off-net terminal devices, it indicates that no terminal device or only a few terminal devices leave the WLAN from the second device A. In this case, the first device may determine the second device A as a non-edge AP device.

In a second specific implementation, the off-net terminal device data of the second device A is the ratio of off-net terminal devices of the second device A. The ratio is a ratio of a quantity of off-net terminal devices of the second device A to a quantity of first-type terminal devices of the second device A, or a ratio of the quantity of off-net terminal devices of the second device A to a quantity of second-type terminal devices of the second device A. The first-type terminal device of the second device A is a terminal device that disconnects from the second device, and the second-type terminal device of the second device A is another device in the first-type terminal devices except the off-net terminal device. That is, a sum of the quantity of second-type terminal devices of the second device A and the quantity of off-net terminal devices of the second device A is the quantity of first-type terminal devices of the second device A. In some specific implementations, when a ratio of off-net terminal devices is the ratio of the quantity of off-net terminal devices of the second device A to the quantity of first-type terminal devices of the second device A, the ratio may also be referred to as an off-net ratio.

Correspondingly, in a process of calculating the ratio of off-net terminal devices of the second device A, the first device may first determine, from terminal devices that disconnect from the second device and based on historical connection data of the plurality of second devices, the terminal device that leaves the WLAN, and count the quantity of off-net terminal devices of the second device A. The first device may count the quantity of first-type terminal devices of the second device A or the quantity of second-type terminal devices of the second device A based on the historical connection data of the second device A. For descriptions of how to determine the quantity of off-net terminal devices of the second device A, the quantity of first-type terminal devices of the second device A, and the quantity of second-type terminal devices of the second device A, refer to the following description. Details are not described herein again.

If the ratio of off-net terminal devices of the second device A is greater than or equal to a threshold ratio of off-net terminal devices, it indicates that a large proportion of the plurality of terminal devices that disconnect from the second device is the off-net terminal devices, and it indicates that a probability that a terminal device connected to the second device A disconnects from the second device A is high. In this case, the first device may determine that after being disconnected from the second device A, the probability that the terminal device connected to the second device A does not establish a connection to the WLAN in a first time interval is high. In this case, the first device determines the second device A as the edge AP device.

If the ratio of off-net terminal devices of the second device A is less than the threshold ratio of off-net terminal devices, it indicates that a small proportion of the plurality of terminal devices that disconnect from the second device A is the off-net terminal devices, and it indicates that a probability that the terminal device connected to the second device A disconnects from the second device A is low. In this case, the first device may determine that after being disconnected from the second device, the probability that the terminal device connected to the second device A does not establish a connection to the WLAN in the first time interval is low. Instead, the terminal device is more likely to establish a connection to another second device in a same WLAN system. In this case, the first device determines the second device A as the non-edge AP device.

It can be learned from the foregoing description that the second device may report the historical connection data to the first device every second time interval. In this case, in a process of determining whether the second device A is the edge AP device, the first device may calculate off-net terminal device data of the second device A in the second time interval. For example, the first device may count a quantity of off-net terminal devices of the second device A in the second time interval, determine whether the quantity of off-net terminal devices of the second device A is greater than or equal to the threshold quantity of off-net terminal devices in a third time interval, and determine the second device A as the edge AP device or the non-edge AP device based on a determining result. Alternatively, the first device may count a quantity of off-net terminal devices of the second device A in the second time interval and a quantity of first-type terminal devices of the second device A in the second time interval, to obtain the ratio of off-net terminal devices of the second device A. Next, the first device may determine whether the ratio of off-net terminal devices of the second device A is greater than or equal to the threshold ratio of off-net terminal devices in a fourth time interval, and determine the second device A as the edge AP device or the non-edge AP device based on a determining result. The second time interval, the third time interval, and the fourth time interval may be the same or may be different. For a specific determining method, refer to the foregoing description. Details are not described herein again.

In a third specific implementation, the off-net terminal device data of the second device A includes the ratio of off-net terminal devices of the second device A and the quantity of off-net terminal devices of the second device A. In this case, the first device may determine the second device as the edge AP device when the quantity of off-net terminal devices of the second device A is greater than or equal to a threshold quantity of off-net terminal devices, and the ratio of off-net terminal devices of the second device is greater than or equal to a threshold ratio of off-net terminal devices.

A method in which the first device determines the quantity of off-net terminal devices of the second device and the quantity of first-type terminal devices of the second device is described below.

It can be learned from the foregoing description that the historical connection data of the second device A may include any one or more of an identifier of the terminal device, a time at which a connection between the terminal device and the second device A is established, and a time at which the terminal device is disconnected from the second device A. In this case, if the historical connection data of the second device A includes a time at which the terminal device B is disconnected from the second device A, it indicates that the terminal device B disconnects from the second device A. In this case, the first device may determine the terminal device B as the first-type terminal device of the second device A. According to the foregoing method, the first device may determine all first-type terminal devices of the second device A, to obtain the quantity of first-type terminal devices of the second device A.

It can be learned from the foregoing description that the quantity of first-type terminal devices of the second device may alternatively be the quantity of first-type terminal devices of the second device in the second time interval. In this case, when calculating the quantity of first-type terminal devices of the second device A, the first device may determine a terminal device that disconnects from the second device A in the second time interval as the first-type terminal device. For example, it is assumed that the first device receives the historical connection data of the second device A at a moment to. The historical connection data includes a time t1 at which the terminal device B is disconnected from the second device A. If a time interval between t0 and t1 is less than or equal to the second time interval, the first device may determine the terminal device B as the first-type terminal device. If the time interval between to and t1 is greater than the second time interval, the first device may determine the terminal device B as the non-first-type terminal device.

It can be learned from the foregoing description that after the terminal device is away from the currently connected second device A, the terminal device leaves entire coverage of the WLAN, or enters signal coverage of another second device in the WLAN system except the second device A. Therefore, after obtaining the first-type terminal device of the second device A, the first device may further determine, based on historical connection data of another second device in the WLAN system, whether each first-type terminal device of the second device A is an off-net terminal device.

Specifically, using the terminal device B as an example, after determining that the terminal device B is the first-type terminal device of the second device A, the first device may query historical connection data of another second devices in the WLAN system to determine whether connection data between the terminal device B and the second device A is included after a time point at which the terminal device B is disconnected from the second device A.

If any other second device in the WLAN system except the second device A does not include the connection data between the terminal device B and the terminal device B, it indicates that after being disconnected from the second device A, the terminal device B does not re-access the WLAN, and the terminal device B leaves the WLAN and is last connected to the second device A before leaving the WLAN. That is, the terminal device B goes off-net from the second device A. In this way, the first device may determine the second device B as the off-net terminal device of the second device A.

If historical connection data of any other one or more second devices in the WLAN system except the second device A includes connection data between the second device and the terminal device B after a time point at which the terminal device B disconnects from the second device A, the first device may further determine a time interval between a time at which the connection is established and a time at which the second device A is disconnected from the terminal device B.

Specifically, it is assumed that the terminal device B disconnects from the second device A at a first time, and then establishes a connection to the second device C at a second time. The first device may first determine a sequence of the first time and the second time. If the second time is earlier than the first time, it indicates that the first device B first establishes the connection to the second device C, and then establishes a connection to the second device A. Because the off-net terminal device of the second device A is a terminal device that is last connected to the second device A before off-net, the second time cannot be used to determine whether the terminal device B is an off-net terminal device.

If the second time is later than the first time, the first device may calculate a time interval between the second time and the first time, and compare the calculated time interval with the first time interval. If the time interval between the second time and the first time is less than the first time interval, it indicates that the terminal device B re-establishes the connection to the second device C in the first time interval after being disconnected from the second device A. In this case, the first device may determine that the purpose of the terminal device B disconnecting from the second device A is to change an AP device that accesses the WLAN, instead of leaving the WLAN. In this case, the first device may determine the terminal device B as a non-first-type terminal device of the second-type terminal device. If the time interval between the first time and the second time is greater than or equal to the first time interval, it indicates that the terminal device B does not access the WLAN in the first time interval after being disconnected from the second device A. That is, the terminal device B goes off-net after being disconnected from the second device A. In this case, the first device may determine the terminal device B as the off-net terminal device of the second device A. According to the foregoing method, the first device may determine all off-net terminal devices of the second device A, to obtain the quantity of off-net terminal devices of the second device A. After obtaining the quantity of off-net terminal devices of the second device A and the quantity of first-type terminal devices of the second device A through calculation, the first device may subtract the quantity of off-net terminal devices of the second device A from the quantity of first-type terminal devices of the second device A, to obtain the quantity of second-type terminal devices of the second device A.

Similar to a method for determining the quantity of first-type terminal devices of the second device A, when determining the quantity of off-net terminal devices of the second device A, the first device may determine the quantity of off-net terminal devices of the second device A in the third time interval. For a specific method, refer to the foregoing description. Details are not described herein again.

In the foregoing specific implementations, the first device may determine, based on the time at which the connection between the second device A and the terminal device B is established and the time at which the second device A is disconnected from the terminal device B, whether the terminal device B is the first-type terminal device and/or the off-net terminal device. In some specific implementations, if historical connection data of a second device does not include a connection establishment time and a disconnection duration, the first device may determine a connection status between the second device and the terminal device B through a parameter, for example, signal strength of the connection between the second device and the terminal device B.

For example, if signal strength between the second device A and the terminal device B is low, it indicates that a connection between the second device A and the terminal device B is unstable. In this case, the first device may determine that the second device A is disconnected from the terminal device B when the signal strength between the second device A and the terminal device B decreases to a value below a preset threshold, and determine that the connection between the second device A and the terminal device B is established when the signal strength between the second device A and the terminal device B increases to a value above the preset threshold. Likewise, the first device may further determine a connection status between the terminal device and the second device based on a rate at which the terminal device receives a data packet, a rate at which the terminal device sends a data packet, a delay value at which the terminal device receives a data packet, and a packet loss rate of the terminal device in the historical connection data, to determine a quantity of first-type terminal devices and a quantity of second-type terminal devices in terminal devices connected to the second device.

By performing the foregoing steps, the first device may obtain a quantity of first-type terminal devices and/or a quantity of second-type terminal devices in terminal devices that have been connected to the second device A. Then, the first device may calculate the off-net terminal device data of the second device A based on the quantity of first-type terminal devices and/or the quantity of second-type terminal devices, to determine, based on the off-net terminal device data of the second device A, whether the second device A is the edge AP device.

The embodiment shown in FIG. 2 is used as an example below for description.

It is assumed that the first device is the network management device 210, the AP device 231 and the AP device 232 may report their respective historical connection data to the network management device 210 through the wireless controller 220, and off-net terminal device data includes an off-net ratio. In this case, the network management device 210 may separately determine a quantity of first-type terminal devices of the AP device 231 and a quantity of off-net terminal devices of the AP device 231 based on the historical connection data of the AP device 231 and the historical connection data of the AP device 232, and then separately calculate an off-net ratio of the AP device 231 and an off-net ratio of the AP device 232, to separately determine whether the AP device 231 and the AP device 232 are edge AP devices.

For example, it is assumed that the historical connection data of the AP device 231 includes a time T11 at which the terminal device 241 is disconnected from the AP device 231, a time T12 at which the terminal device 242 is disconnected from the AP device 231, a time T13 at which a connection between the terminal device 243 and the AP device 231 is established, and a time T14 at which a connection between the terminal device 244 and the AP device 231 is established. Historical connection data of the AP device 233 includes a time T21 at which a connection between the terminal device 241 and the AP device 232 is established, a time T22 at which the terminal device 243 is disconnected from the AP device 232, and a time T23 at which the terminal device 244 is disconnected from the AP device 232. T11 is earlier than T21, and an interval between T11 and T21 is less than a first time interval. T22 is earlier than T13, and a time interval between T22 and T13 is less than the first time interval. T23 is earlier than T14, and a time interval between T23 and T14 is less than the first time interval. A time interval between any one of T11, T12, T13, T14, T21, T22, and T23 and a current time is less than a second time interval.

It can be learned from the foregoing historical data that in the second time interval, the terminal device 241 first disconnects from the AP device 231, re-establishes a connection to the AP device 232 in the first time interval, and re-accesses the WLAN. The terminal device 242 first disconnects from the AP device 231, and does not connect to another AP device in the WLAN in the first time interval, and leaves the WLAN. The terminal device 243 first disconnects from the AP device 232, re-establishes a connection to the AP device 231 in the first time interval, and re-accesses the WLAN. The terminal device 244 first disconnects from the AP device 232, re-establishes a connection to the AP device 231 in the first time interval, and re-accesses the WLAN.

Based on this, the network management device 210 may determine the terminal device 241 and the terminal device 242 as the first-type terminal devices of the AP device 231, determine the terminal device 242 as the off-net terminal device of the AP device 231, and determine the terminal device 243 and the terminal device 244 as the first-type terminal devices of the AP device 232. Based on this, the network management device 210 may calculate that the off-net ratio of the AP device 231 is 1/(1+1)=0.5, and the off-net ratio of the AP device 232 is 0/(1+1)=0. If the preset threshold is 0.4, because the off-net ratio of the AP device 231 is 0.5, and the off-net ratio of the AP device 232 is 0, the network management device 210 may determine the AP device 231 as an edge AP device, and determine the AP device 232 as a non-edge AP device.

The foregoing describes a method for determining, by the first device based on the off-net terminal device data of the second device A, whether the second device A is the edge AP device. The following describes a method for determining, by the first device based on a quantity of target signal strength terminal devices of the second device, whether the second device A is the edge AP device.

A principle for deploying AP devices in network planning is described first.

Signal strength of an AP device gradually decreases as a distance increases. As a result, the AP device can provide a WLAN access service for a terminal device within a range. To improve network quality of a terminal device, an area whose signal strength is higher than a threshold may be used as signal coverage of an AP device. In this case, when a WLAN is deployed for an area M, a plurality of AP devices are planned in the area M based on signal coverage of the AP device, so that signal coverage of the plurality of AP devices can fully cover the area M. If a terminal device moves out of signal coverage of a currently connected AP device in the area M, the terminal device enters signal coverage of another AP device. In this way, only a connected AP device needs to be switched, so that in a process in which the terminal device moves in the area M, signal strength of the terminal device is always greater than the threshold.

In embodiments of this application, a signal strength threshold used to divide signal coverage of an AP device is referred to as a signal strength baseline value, and signal strength may be represented by a received signal strength indication (RSSI). In some embodiments, the signal strength baseline value may be a static fixed value. For example, the signal strength baseline value is a minimum signal strength that is specified during WLAN network planning and that needs be ensured when a WLAN terminal device accesses the WLAN network. In some specific implementations, a value range of the signal strength baseline value may be from −75 decibels relative to one milliwatt (dBm) to −80 dBm. In a network planning process, if signal strength of the AP device at a first location is less than the signal strength baseline value, it may be considered that the first location is outside signal coverage of the AP device, and a new AP device may be deployed to cover the first location. In some embodiments, the signal strength baseline value is a dynamic value, and is a statistical value based on signal strength values of all AP devices deployed in the WLAN network. For example, there are five APs in a WLAN network, and a value of lowest signal strength in signal strength data of each AP device and a terminal device connected to the AP device is obtained, where a lowest signal strength value of AP1 is −80 dBm, a lowest signal strength value of AP2 is −75 dBm, a lowest signal strength value of AP3 is −83 dBm, a lowest signal strength value of AP4 is −79 dBm, and a lowest signal strength value of AP5 is −85 dBm. An average value of lowest signal strength values of all AP devices is −80.4 dBm, and the signal strength baseline value is −80.4 dBm.

If each AP device in a WLAN system is planned and deployed based on a signal strength baseline value, for a terminal device B within coverage of the WLAN, regardless of how the terminal device B moves, signal strength of the terminal device B is always greater than the signal strength baseline value. In a process in which the terminal device B leaves the WLAN, the signal strength of the terminal device B gradually decreases to be less than the signal strength baseline value. Therefore, the signal strength threshold may be set based on the signal strength baseline value. In some embodiments, the signal strength baseline value is used as the signal strength threshold. For example, if the signal strength baseline value is −80 dBm, the signal strength threshold is −80 dBm. In some other embodiments, an average value of the signal strength baseline value and a medium signal strength value is used as the signal strength threshold. According to WLAN planning of an enterprise, signal strength greater than or equal to −70 dBm is considered as an ideal signal strength, and signal strength between −70 dBm and −80 dBm is considered as a medium signal strength. For example, when the signal strength baseline value is −80.4 dBm, and the medium signal strength is −80 dBm, the average value of the signal strength baseline value and the medium signal strength value is −80.2 dBm, and the signal strength threshold is −80.2 dBm.

If signal strength of a terminal device is greater than the signal strength threshold, it indicates that the terminal device is within signal coverage of the AP device and does not leave coverage of the WLAN. If the signal strength of the terminal device is less than or equal to the signal strength threshold, it indicates that the terminal device leaves the signal coverage of a currently connected AP device, and does not enter signal coverage of another AP device, that is, the terminal device leaves the coverage of the WLAN. It can be learned that whether the terminal device is off-net may be determined by comparing the signal strength of the terminal device with the signal strength threshold.

It can be learned from the foregoing description that connection data of the second device may include signal strength of a connection between each terminal device connected to the second device and the second device. In this case, the first device may first determine a target signal strength terminal device from terminal devices connected to the second device A (or that have been connected to the second device A), count a quantity of target signal strength terminal devices, and determine, based on the quantity of target signal strength terminal devices, whether the second device A is an edge AP device. The target signal strength terminal device of the second device is a terminal device whose signal strength is less than or equal to the signal strength threshold in at least one terminal device connected to the second device, and the signal strength threshold is determined based on the signal strength baseline value of the WLAN. The connection data of the second device may be historical connection data or real-time connection data. The target signal strength terminal device in the terminal devices that have been connected to the second device A may be determined based on the historical connection data of the second device, and the target signal strength terminal device in the terminal devices connected to the second device A may be determined based on the real-time connection data of the second device.

Specifically, the first device may separately compare to determine whether signal strength of each terminal device in the historical connection data of the second device A is less than or equal to the signal strength threshold. If signal strength of a connection between the terminal device B and the second device A is less than or equal to the signal strength threshold, it indicates that the terminal device B leaves signal coverage of the second device A, and does not disconnect from the second device A. Because the terminal device B does not disconnect from the second device A, it indicates that the terminal device B cannot establish a connection to another second device in the WLAN system except the second device A. Therefore, the first device may determine the terminal device B as the target signal strength terminal device.

It should be noted that the historical connection data of the second device A may be connection data of the second device A in the second time interval. In this case, the first device may determine, as the target signal strength terminal device, a terminal device that has established a connection to the second device A within the second time interval and whose signal strength with the second device A used to be less than the signal strength threshold.

For a method for determining, based on the real-time connection data of the second device, the target signal strength terminal device in the terminal devices connected to the second device A, refer to the foregoing method for determining, based on the historical connection data of the second device, the target signal strength terminal device in the terminal devices that have been connected to the second device A. Details are not described herein again.

In embodiments of this application, the WLAN system may include one or more second devices. To distinguish between the second device that is determined by the first device as the edge AP device and another second device, the edge AP device is used below to replace the second device for description.

S304: The first device sends an indication message to the edge AP device.

After determining any one or more second devices in the WLAN system as the edge AP devices, the first device may send the indication message to the edge AP device, where the indication message indicates the edge AP device to disconnect from the target terminal device. In some specific implementations, when the first device is a controller, the first device may send the indication message to the edge AP device through a wireless controller device.

In embodiments of this application, the target terminal device may be determined by the first device, or may be determined by the edge AP device. In the embodiment shown in FIG. 3, an example in which the target terminal device is determined by the edge AP device is used for description. When the target terminal device is determined by the first device, before sending the indication message to the edge AP device, the first device may first determine the target terminal device based on the historical connection data of the edge AP device. For a detailed description of the determining method, refer to the following description of an embodiment shown in FIG. 4. Details are not described herein again.

In some embodiments, the indication message sent by the first device includes an identifier of the target terminal device on the edge AP device. In some other embodiments, the indication message sent by the first device may further include instruction information used to enable the edge AP device to determine or process the target terminal device. In some other embodiments, the indication information sent by the first device may further include a movement status identification model. The movement status identification model is used by the edge AP device to identify the target terminal device. For content of this part, refer to the following description. Details are not described herein again.

S305: The edge AP device determines the target terminal device based on the indication message.

After receiving the indication message, the edge AP device may determine the target terminal device based on the indication message. The target terminal device is a terminal device that is in a state of being away from the second device and located at a coverage edge of the WLAN, in the at least one terminal device connected to the second device. In some specific implementations, after receiving the indication message, the edge AP device may obtain connection data of the edge AP device, and determine the target terminal device based on the connection data. The connection data reflects a connection status of each terminal device in the at least one terminal device connected to the edge AP device. In some specific implementations, the connection data in S305 may be the same as or different from the historical connection data of the second device in the foregoing steps.

When the target terminal device is determined based on the connection data of the edge AP device, the edge AP device may determine a terminal device whose signal strength is less than the preset threshold as the target terminal device, or may determine, when a terminal device is sticky to the edge AP device, the terminal device as the target terminal device. In some specific implementations, the edge AP device may further determine a movement status of the terminal device based on the connection data, and then determine, based on the movement status of the terminal device, whether the terminal device is the target terminal device. A first terminal device is used as an example below for detailed description.

In a process of determining whether the first terminal device is the target terminal device, the edge AP device may first determine a movement status of the first terminal device based on signal strength of a connection between the first terminal device and the edge AP device in a fifth time interval. The movement status of the first terminal device indicates a movement trend of the first terminal device relative to the edge AP device in the fifth time interval, and may include, for example, a far-away state and a close-to state. The close-to state indicates that the first terminal device moves in a direction towards the edge AP device, and the far-away state indicates that the first terminal device moves in a direction opposite to the edge AP device. Correspondingly, in the close-to state, a distance between the first terminal device and the edge AP device gradually decreases; and in the far-away state, the distance between the first terminal device and the edge AP device gradually increases. In some specific implementations, the fifth time interval may be the same as or different from the second time interval.

In some specific implementations, to determine the movement status of the first terminal device more quickly, the edge AP device may determine the movement status of the first terminal device through a movement status identification model. An input of the movement status identification model is a change trend of signal strength of a connection between a terminal device and an AP device with time, and an output is a movement status of the terminal device relative to the AP device. In a process of determining the movement status of the first terminal device, the edge AP device may input the signal strength of the connection between the first terminal device and the edge AP device in the fifth time interval to the movement status identification model, to determine the movement status of the first terminal device through the movement status identification model. In some specific implementations, the movement status identification model is a machine learning model, and may be pre-trained and configured in the AP device, or may be trained by the first device after determining the edge AP device, and sent to the edge AP device through the indication message.

After determining the movement status of the first terminal device, the edge AP device may determine whether the movement status of the first terminal device meets the first condition. The first condition includes that after the first terminal device is connected to the second device, a distance between the first terminal device and the second device presents a change trend of decreasing first and then increasing, that is, the movement status of the first terminal device in the fifth time interval is first the close-to state, and then the far-away state. If the movement status of the first terminal device meets the first condition, it indicates that the first terminal device first moves from signal coverage of another AP device in the WLAN to the signal coverage of the edge AP device, then approaches the edge AP device in the signal coverage of the edge AP device, and then is away from the edge AP device. In other words, the first terminal device moves from inside of the WLAN to a location of the edge AP device, and gradually moves away from the edge AP device. This indicates that the first terminal device is more likely to be a terminal device that leaves signal coverage of the WLAN from the inside of the WLAN. Therefore, the edge AP device may determine the first terminal device as the target terminal device.

In some specific implementations, the edge AP device may alternatively determine, based on connection duration and the movement status, whether the first terminal device is the target terminal device. In some specific implementations, the connection data of the first terminal device may include connection duration between the first terminal device and the edge AP device, that is, total duration for which the first terminal device is connected to the edge AP device. The edge AP device may determine whether the connection duration between the first terminal device and the edge AP device meets a second condition. The second condition includes that the connection duration is greater than or equal to a preset time threshold. If the connection duration meets the second condition and the movement status meets the first condition, the edge AP device may determine the first terminal device as the target terminal device. If the connection duration does not meet the second condition and/or the movement status does not meet the first condition, the edge AP device may determine the first terminal device as a non-target terminal device.

S306: The edge AP device disconnects from the target terminal device.

After determining the target terminal device, the edge AP device may disconnect from the target terminal device, so that the target terminal device disconnects from the WLAN, to access a mobile network in advance. In some specific implementations, the edge AP device may send a disconnection request message to the target terminal device, so that the target terminal device disconnects from the edge AP device based on an indication of the disconnection request message.

By performing the foregoing method, one or more second devices in a plurality of second devices in a WLAN system may be determined as an edge AP device. In a time period corresponding to historical connection data, there are terminal devices that go off-net through an edge AP. It can be learned that the edge AP device is an AP device deployed at an edge of a WLAN. The terminal device may leave entire signal coverage of the WLAN by leaving signal coverage of the edge AP device. However, in a same WLAN system, there is no off-net terminal device in another AP device except the edge AP device, or a quantity of off-net terminal devices is small. In other words, there is a high probability that a terminal device connected to the edge AP device goes off-net, and there is a low probability that a terminal device connected to the non-edge AP device goes off-net. Therefore, the edge AP device controls the terminal device to go off-net, and the non-edge AP device does not control the terminal device to go off-net. This can avoid identifying a terminal device that does not need to go off-net as a terminal device that needs to go off-net, so that accuracy of identifying the target terminal device is improved.

Figure 4:
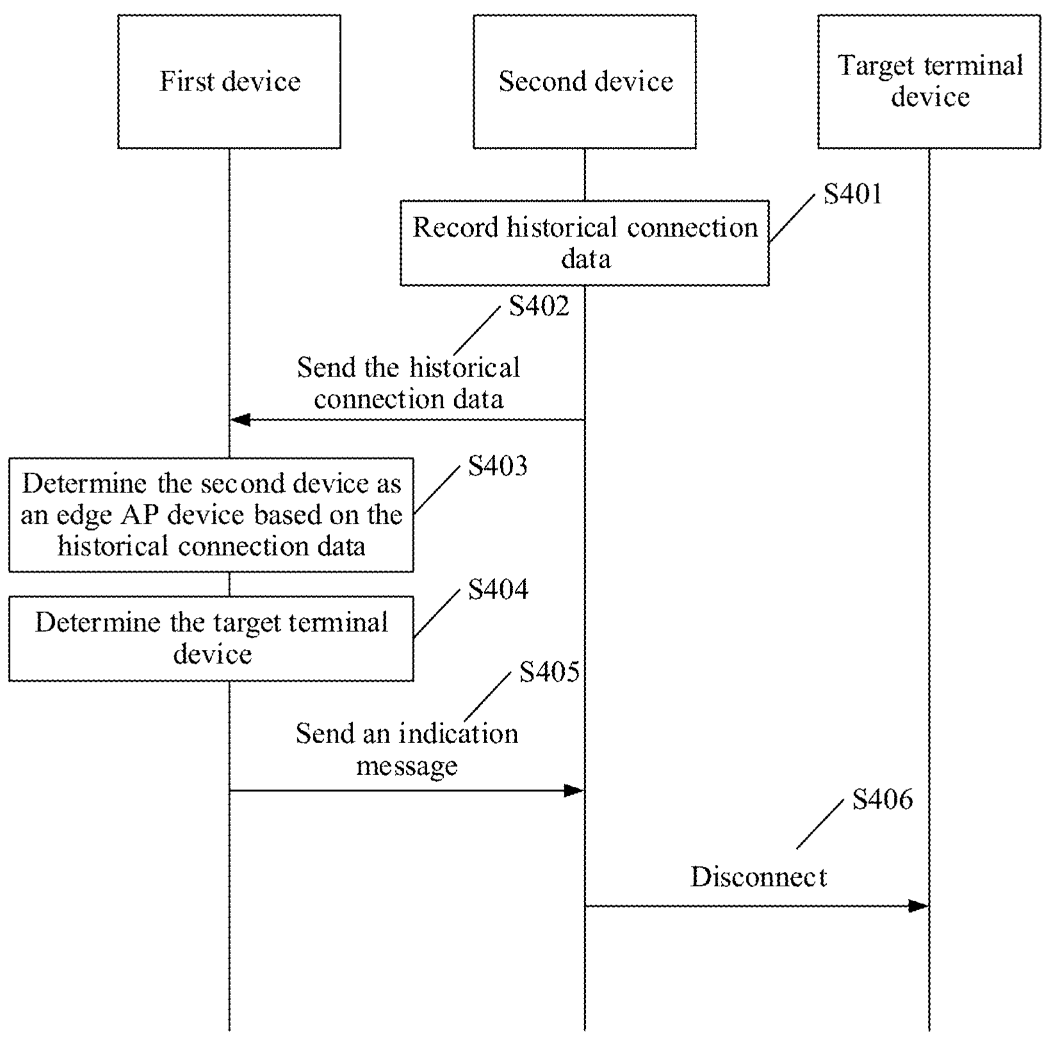
FIG. 4 is another signaling interaction diagram of a device identification method and a terminal device processing method according to an embodiment of this application.

In the embodiment shown in FIG. 3, the target terminal device is determined by the edge AP device based on the connection data. In some other specific implementations, the target terminal device may alternatively be determined by the first device. With reference to FIG. 4, an implementation in which the target terminal device is determined by the first device is described below in detail.

FIG. 4 is a signaling interaction diagram of a device identification method and a terminal device processing method according to an embodiment of this application. The device identification method and the terminal device processing method provided in this embodiment of this application may include the following steps.

S401: A second device records historical connection data.

In this embodiment, a target terminal device is determined by a first device. Correspondingly, the historical connection data sent by the second device to the first device may include signal strength of each terminal device in at least one terminal device connected to the second device and an identifier of the terminal device.

To enable the first device to discover the target terminal device in time, the second device may periodically record the historical connection data. For example, the second device may record the historical connection data every second time interval. In some specific implementations, the second device may alternatively record the historical connection data after a connection status of the terminal device is greatly changed.

S402: The second device sends the historical connection data to the first device.

After obtaining the historical connection data, the second device may send the historical connection data to the first device. For a detailed description of S403, refer to the description of S302 in the embodiment corresponding to FIG. 3. Details are not described herein again.

In this embodiment of this application, an example in which the second device stores connection data and intermittently reports the historical connection data is used for description. In some specific implementations, the second device may alternatively report the connection data in real time, and the first device may store and manage the connection data reported by the second device.

S403: The first device determines the second device as an edge AP device based on the historical connection data.

The first device may receive the historical connection data reported by the one or more second devices in a WLAN system, and determine the edge AP device based on the historical connection data. For description of S403, refer to the description of S303 in the embodiment corresponding to FIG. 3. Details are not described herein again.

S404: The first device determines, based on the historical connection data, the target terminal device from terminal devices connected to the edge AP device.

After determining the edge AP device, the first device may determine, based on the historical connection data, the target terminal device from the terminal devices connected to the edge AP device.

Specifically, the first device may first determine, based on the historical connection data of the edge AP device, the one or more terminal devices connected to the edge AP device, and then determine whether the target terminal device exists in the one or more terminal devices connected to the edge AP device. For example, the first device may determine a movement status of the terminal device based on the historical connection data, and determine, based on the movement status, whether each terminal device in the one or more terminal devices connected to the edge AP device is the target terminal device.

For a related description of determining, by the first device, whether the terminal device is the target terminal device, refer to the description of S305 in the embodiment corresponding to FIG. 3. Details are not described herein again.

S405: The first device sends an indication message to the edge AP device.

After determining the target terminal device from the terminal devices connected to the edge AP device, the first device may send the indication message to the edge AP device, where the indication message indicates the edge AP device to disconnect from the target terminal device. In some specific implementations, the indication message may include an identifier of the target terminal device, so that the edge AP device determines the target terminal device that is to be disconnected.

For a detailed description of S405, refer to the description of S304 in the embodiment corresponding to FIG. 3. Details are not described herein again.

S406: The edge AP device disconnects from the target terminal device.

After receiving the indication message, the edge AP device may determine, based on the indication message, the target terminal device that is to be disconnected, and disconnect from the target terminal device.

According to the method shown in the embodiment in FIG. 4, the edge AP device may control the terminal device to go off-net, and a non-edge AP device does not control the terminal device to go off-net. This can avoid identifying a terminal device that does not need to go off-net as a terminal device that needs to go off-net, so that accuracy of identifying the target terminal device is improved. In addition, because the target terminal device is determined by the first device, a method for identifying the target terminal device does not need to be deployed on the second device, thereby reducing the load of the second device.

Figure 5:
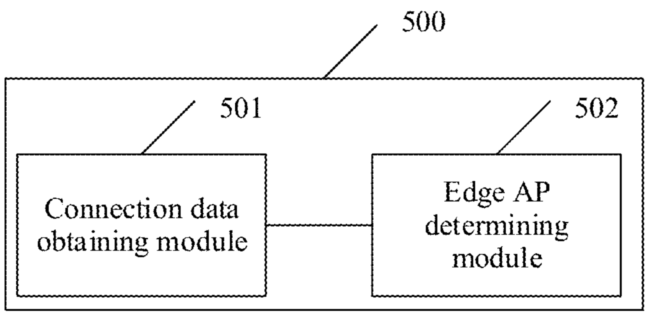
FIG. 5 is a schematic diagram of a structure of a device identification apparatus according to an embodiment of this application.

Correspondingly, refer to FIG. 5. An embodiment of this application further provides a device identification apparatus. The device identification apparatus 500 includes:

- a connection data obtaining module 510, configured to obtain historical connection data of a second device, where the historical connection data reflects a connection status between each terminal device in at least one terminal device that used to be connected to the second device and a WLAN; and
- an edge AP determining module 520, configured to determine the second device as an edge AP device based on off-net terminal device data of the second device, where the off-net terminal device data of the second device includes a quantity and/or a ratio of off-net terminal devices of the second device; and the off-net terminal device of the second device is a terminal device, in the at least one terminal device that used to be connected to the second device, that remains in a disconnected state in a first time interval after being disconnected from the second device.

In some specific implementations, the device identification apparatus 500 shown in FIG. 5 further includes:

- a target terminal device determining module, configured to determine a target terminal device based on a movement status of at least one terminal device connected to the second device; and
- a target terminal device processing module, configured to disconnect the target terminal device from the second device, where the target terminal device is a terminal device that is in a state of being away from the second device and located at a coverage edge of the WLAN, in the at least one terminal device connected to the second device.

For a specific working procedure of the device identification apparatus shown in FIG. 5, refer to related descriptions in the embodiments corresponding to FIG. 3 and FIG. 4.

Figure 6:
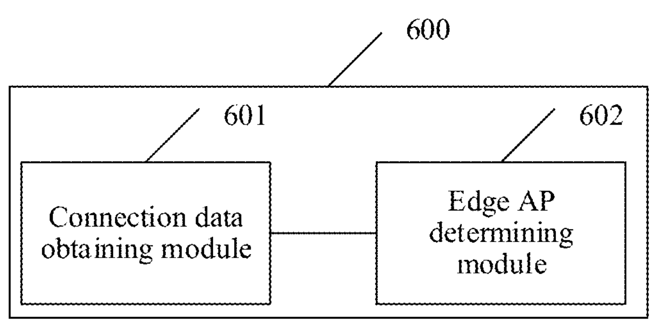
FIG. 6 is a schematic diagram of a structure of a device identification apparatus according to an embodiment of this application.

Correspondingly, refer to FIG. 6. An embodiment of this application further provides a device identification apparatus. The device identification apparatus 600 includes:

- a connection data obtaining module 610, configured to obtain connection data of a second device, where the connection data reflects signal strength of each terminal device in at least one terminal device connected to the second device; and
- an edge AP determining module 620, configured to determine the second device as an edge AP device based on a quantity of target signal strength terminal devices of the second device, where the target signal strength terminal device of the second device is a terminal device whose signal strength is lower than or equal to a signal strength threshold in the at least one terminal device connected to the second device, and the signal strength threshold is based on a signal strength baseline value of a WLAN.

In some specific implementations, the device identification apparatus 600 shown in FIG. 6 further includes:

a target terminal device determining module, configured to determine a target terminal device based on a movement status of at least one terminal device connected to the second device; and a target terminal device processing module, configured to disconnect the target terminal device from the second device, where the target terminal device is a terminal device that is in a state of being away from the second device and located at a coverage edge of the WLAN, in the at least one terminal device connected to the second device.

For a specific working procedure of the device identification apparatus shown in FIG. 6, refer to related descriptions in the embodiments corresponding to FIG. 3 and FIG. 4.

Figure 7:
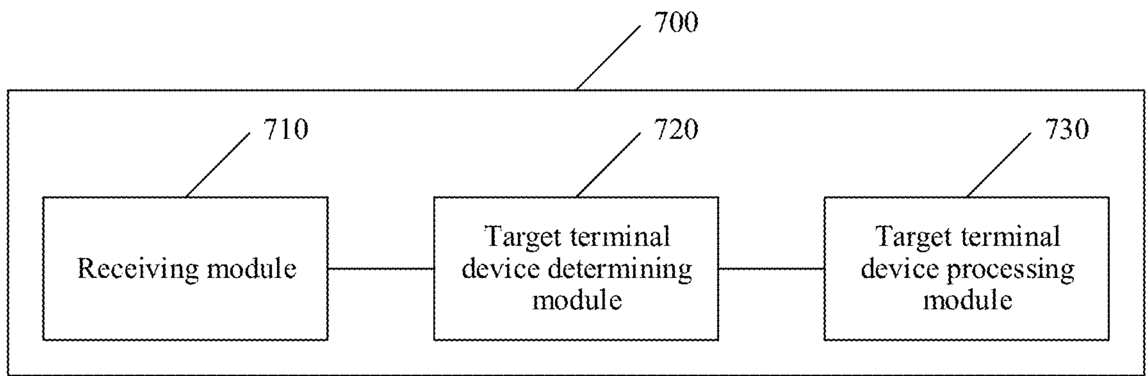
FIG. 7 is a schematic diagram of a structure of a terminal device processing apparatus according to an embodiment of this application.

Correspondingly, refer to FIG. 7. An embodiment of this application further provides a terminal device processing apparatus. The terminal device processing apparatus 700 includes:

a receiving module 710, configured to receive an indication message, where the indication message indicates that the apparatus is an edge wireless access point AP device;

a target terminal device determining module 720, configured to determine a target terminal device in at least one terminal device connected to the apparatus, where the target terminal device is a terminal device, in the at least one terminal device connected to the apparatus, that is in a state of being away from the second device and is located at a coverage edge of a WLAN; and a target terminal device processing module 730, configured to disconnect the target terminal device from the apparatus.

In some specific implementations, the target terminal device determining module 720 shown in FIG. 7 is specifically configured to:

obtain connection data of the apparatus, where the connection data reflects a connection status of each terminal device in the at least one terminal device connected to the apparatus; and determine the target terminal device based on the connection data.

For a specific working procedure of the terminal device processing apparatus shown in FIG. 7, refer to a related description in the embodiment corresponding to FIG. 3.

Figure 8:
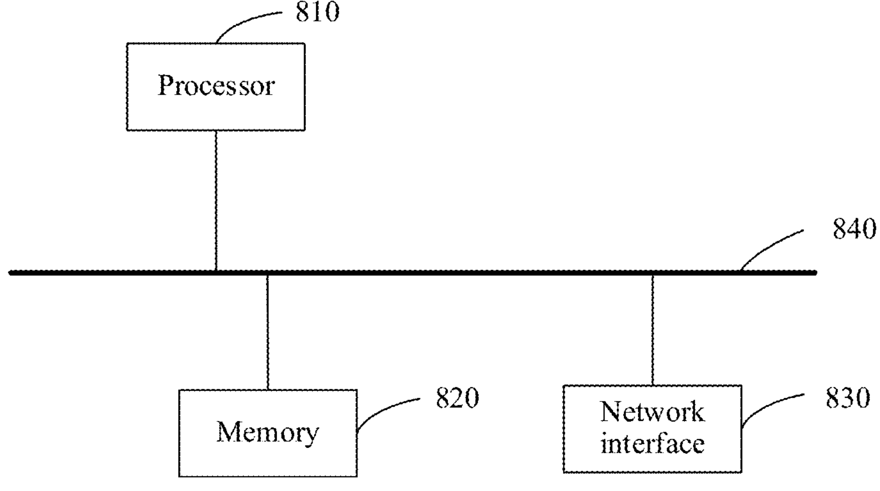
FIG. 8 is a diagram of a hardware architecture of a device according to an embodiment of this application.

Refer to FIG. 8. An embodiment of this application further provides a device. The device may perform the method performed by the first device or the second device in the embodiments shown in FIG. 3 or FIG. 4. The device includes:

a processor 810, a memory 820, and a network interface 830. The processor 810, the memory 820, and the network interface 830 are connected to each other through a bus 840.

The memory 820 includes but is not limited to a random access memory (RAM), a read-only memory (ROM), an erasable programmable read-only memory (EPROM or flash memory), or a portable read-only memory (CD-ROM).

The processor 810 may be one or more central processing units (CPU). When the processor 810 is one CPU, the CPU may be a single-core CPU, or may be a multi-core CPU.

The network interface 830 may be a wired interface, for example, a fiber distributed data interface (FDDI), or a gigabit ethernet (GE) interface. Alternatively, the network interface 830 may be a wireless interface.

The network interface 830 is configured to receive connection information and/or send an indication message, or is configured to establish a connection to a terminal device and/or receive an indication message.

The memory 820 is configured to store program code.

Optionally, the processor 810 may be configured to read program code stored in the memory 820, to perform the following operations:

obtaining historical connection data of the second device, where the historical connection data reflects a connection status between each terminal device in at least one terminal device that used to be connected to the second device and a WLAN; determining the second device as an edge wireless access point AP device based on off-net terminal device data of the second device, where the off-net terminal device data of the second device includes a quantity and/or a ratio of off-net terminal devices of the second device; and the off-net terminal device of the second device is a terminal device, in the at least one terminal device that used to be connected to the second device, that remains in a disconnected state in a first time interval after being disconnected from the second device.

Alternatively, the processor 810 may be configured to read program code stored in the memory 820, to perform the following operations:

obtaining historical connection data of the second device, where the historical connection data reflects a signal strength of each terminal device in at least one terminal device connected to the second device; and determining the second device as an edge wireless access point AP device based on a quantity of target signal strength terminal devices of the second device, where the target signal strength terminal device of the second device is a terminal device whose signal strength is less than or equal to a signal strength threshold in the at least one terminal device connected to the second device, and the signal strength threshold is based on a signal strength baseline value of a WLAN.

Alternatively, the processor 810 may be configured to read program code stored in the memory 820, to perform the following operations:

receiving an indication message, where the indication message indicates that the second device is an edge wireless access point AP; determining a target terminal device from at least one terminal device connected to the second device, where the target terminal device is a terminal device, in the at least one terminal device connected to the second device, that is in a state of being away from the second device and is located at a coverage edge of a WLAN; and disconnecting from the target terminal device.

For implementation of the device shown in FIG. 8, refer to related descriptions in the embodiments corresponding to FIG. 3 and FIG. 4.

An embodiment of this application further provides a computer-readable storage medium, including a computer program. When the computer program is executed by a processor, the foregoing device determining method is performed.

An embodiment of this application further provides a computer-readable storage medium, including a computer program. When the computer program is executed by a processor, the foregoing terminal device processing method is performed.

An embodiment of this application further provides a computer program product, including a program or code. When the program or the code is run on a computer, the foregoing device determining method is implemented.

An embodiment of this application further provides a computer program product, including a program or code. When the program or the code is run on a computer, the foregoing terminal device processing method is implemented.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way is interchangeable in proper circumstances, so that embodiments described herein can be implemented in another order than the order illustrated or described herein. In addition, terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

It may be clearly understood by a person skilled in the art that, for convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus and method may be implemented in other manners. For example, the described apparatus embodiment is merely an example. For example, division into the units is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The storage medium includes any medium that can store program code, for example, a USB flash drive, a removable hard disk, a read-only memory (ROM), a random access memory (RAM), a magnetic disk, or an optical disc.

A person skilled in the art should be aware that in the foregoing one or more examples, functions described in the present invention may be implemented by hardware, software, firmware, or any combination thereof. When the functions are implemented by software, the functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or dedicated computer.

What is claimed is:

1. A device identification method, comprising:

obtaining historical connection data of a second device belonging to a wireless local area network (WLAN), wherein the historical connection data reflects a connection status between each of at least one terminal device that used to be connected to the second device and the WLAN; and determining the second device as an edge wireless access point (AP) device based on off-net terminal device data of the second device, wherein the off-net terminal device data of the second device comprises a quantity or a ratio of off-net terminal devices of the second device, the off-net terminal devices of the second device are terminal devices that remain in a disconnected state in a first time interval after being disconnected from the second device, and the at least one terminal device that used to be connected to the second device includes the off-net terminal devices, wherein determining the second device as the edge AP device based on off-net terminal device data of the second device comprises:

in response to the quantity of off-net terminal devices of the second device being greater than or equal to a threshold quantity of off-net terminal devices, determining the second device as the edge AP device, or in response to the ratio of off-net terminal devices of the second device being greater than or equal to a threshold ratio of off-net terminal devices, determining the second device as the edge AP device.

2. The method according to claim 1, wherein:

the ratio of off-net terminal devices of the second device is a ratio of the quantity of off-net terminal devices of the second device to a quantity of first-type terminal devices, or is a ratio of the quantity of off-net terminal devices of the second device to a quantity of second-type terminal devices;

the first-type terminal device is a terminal device that disconnects from the second device; and the quantity of the second-type terminal devices is obtained by subtracting the quantity of off-net terminal devices of the second device from the quantity of the first-type terminal devices.

3. The method according to claim 1, wherein the method further comprises:

determining a target terminal device based on a movement status of at least one terminal device connected to the second device; and disconnecting the second device from the target terminal device, wherein the target terminal device is a terminal device that is in a state of being away from the second device and located at a coverage edge of the WLAN, and the at least one terminal device connected to the second device includes the target terminal device.

4. The method according to claim 3, wherein determining the target terminal device based on the movement status of at least one terminal device connected to the second device comprises:

obtaining, based on a movement status identification model, the movement status of the at least one terminal device connected to the second device, wherein the movement status identification model is a machine learning model; and determining the target terminal device based on the movement status of the terminal device.

5. The method according to claim 1, wherein the method is performed by a first device, the first device comprises a network management device or a wireless controller, and the second device comprises a wireless AP device or a network device supporting an AP function.

6. An electronic device comprising:

a memory with instructions stored thereon; and a processor coupled to the memory, wherein the instructions, when executed by the processor, enable the electronic device to:

obtain historical connection data of a device, wherein the historical connection data reflects a connection status between each of at least one terminal device that used to be connected to the device and a wireless local area network (WLAN), and the device belongs to the WLAN, determine the device as an edge wireless access point (AP) device based on off-net terminal device data of the device, wherein the off-net terminal device data of the device comprises a quantity or a ratio of off-net terminal devices of the device, the off-net terminal devices of the device are terminal devices that remain in a disconnected state in a first time interval after being disconnected from the device, and the at least one terminal device that used to be connected to the device includes the off-net terminal devices, wherein the device is determined as the edge AP device based on the off-net terminal device data of the device by:

in response to the quantity of off-net terminal devices of the device being greater than or equal to a threshold quantity of off-net terminal devices, determine the device as the edge AP device, or in response to the ratio of off-net terminal devices of the device being greater than or equal to a threshold ratio of off-net terminal devices, determine the device as the edge AP device.

7. The electronic device according to claim 6, wherein:

the ratio of off-net terminal devices of the device is a ratio of the quantity of off-net terminal devices of the device to a quantity of first-type terminal devices, or is a ratio of the quantity of off-net terminal devices of the device to a quantity of second-type terminal devices;

the first-type terminal device is a terminal device that disconnects from the device; and the quantity of the second-type terminal devices is obtained by subtracting the quantity of off-net terminal devices of the device from the quantity of the first-type terminal devices.

8. The electronic device according to claim 6, wherein the instructions, when executed by the processor, further enable the electronic device to:

determine a target terminal device based on a movement status of at least one terminal device connected to the device; and disconnect the device from the target terminal device, wherein the target terminal device is a terminal device that is in a state of being away from the device and located at a coverage edge of the WLAN, and the at least one terminal device connected to the device includes the target terminal device.

9. The electronic device according to claim 8, wherein the instructions, when executed by the processor, further enable the electronic device to: determine the target terminal device based on the movement status of at least one terminal device connected to the device by:

obtaining, based on a movement status identification model, the movement status of the at least one terminal device connected to the device, wherein the movement status identification model is a machine learning model; and determine the target terminal device based on the movement status of the terminal device.

10. The electronic device according to claim 6, wherein the electronic device comprises a network management device or a wireless controller, and the device comprises a wireless access point AP device or a network device supporting an AP function.

11. An electronic device comprising:

a memory with instructions stored thereon; and a processor coupled to the memory, wherein the instructions, when executed by the processor, enable the electronic device to:

obtain connection data of a device, wherein the connection data reflects signal strength of each terminal device of at least one terminal device connected to the device, wherein the device belongs to a wireless local area network (WLAN);

determine the device as an edge wireless access point (AP) device based on a quantity of target signal strength terminal devices of the device, wherein the target signal strength terminal device of the device is a terminal device whose signal strength is less than or equal to a signal strength threshold in the at least one terminal device connected to the device, and the signal strength threshold is based on a signal strength baseline value of the WLAN;

determine a target terminal device based on a movement status of the at least one terminal device connected to the device; and disconnect the device from the target terminal device, wherein the target terminal device is a terminal device that is to leave the device and approach a coverage edge of the device, and the at least one terminal device connected to the device includes the target terminal device.

12. The electronic device according to claim 11, wherein the instructions, when executed by the processor, further enable the electronic device to determine the target terminal device based on the movement status of the at least one terminal device connected to the device by:

obtaining, based on a movement status identification model, the movement status of the at least one terminal device connected to the device, wherein the movement status identification model is a machine learning model; and determining the target terminal device based on the movement status of the terminal device.

13. An electronic device comprising:

a memory with instructions stored thereon; and a processor coupled to the memory, wherein the instructions, when executed by the processor, enable the electronic device to:

receive an indication message, wherein the indication message indicates that the electronic device is an edge wireless access point (AP), and the electronic device belongs to a wireless local area network (WLAN);

determine a target terminal device from at least one terminal device connected to the electronic device, wherein the target terminal device is a terminal device that is in a state of being away from the electronic device and located at a coverage edge of the WLAN, the at least one terminal device connected to the electronic device comprises a first terminal device, connection data of the first terminal device comprises signal strength of a connection between the first terminal device and the electronic device, and the target terminal device is determined based on the connection data by:

determining a movement status of the first terminal device based on the signal strength of the connection between the first terminal device and the electronic device in a first time interval; and in response to the movement status of the first terminal device meeting a first condition, determining the first terminal device as the target terminal device, wherein the first condition comprises, after the first terminal device is connected to the electronic device, a distance between the first terminal device and the electronic device presenting a change trend of decreasing first and then increasing; and disconnect from the target terminal device.

14. The electronic device according to claim 13, wherein the instructions, when executed by the processor, enable the electronic device to determine the target terminal device from th at least one terminal device connected to the electronic device by:

obtaining connection data of the electronic device, wherein the connection data reflects a connection status of each terminal device of the at least one terminal device connected to the electronic device; and determining the target terminal device based on the connection data.

15. The electronic device according to claim 13, wherein the instructions, when executed by the processor, further enable the electronic device to determine the movement status of the first terminal device based on the signal strength of the connection between the first terminal device and the electronic device in the first time interval by:

determining the movement status of the first terminal device based on the signal strength using a movement status identification model, wherein the movement status identification model is a machine learning model.

16. The electronic device according to claim 13, wherein the connection data further comprises a connection duration between the terminal device and the electronic device; and the instructions, when executed by the processor, further enable the electronic device, before the determining the first terminal device as the target terminal device:

determine that the connection duration meets a second condition, wherein the second condition comprises the connection duration being greater than or equal to a preset time threshold.

17. The method according to claim 3, wherein determining the target terminal device based on the movement status comprises:

determining that the movement status of the target terminal device meets a first condition, wherein the first condition comprises, after the target terminal device is connected to the second device, a distance between the target terminal device and the second device presenting a change trend of decreasing first and then increasing.

18. The method according to claim 3, wherein:

connection data of the target terminal device comprises a connection duration between the target terminal device and the second device; and the method further comprises, before disconnecting the second device from the target terminal device, determining that the connection duration meets a second condition, wherein the second condition comprises the connection duration being greater than or equal to a preset time threshold.

19. The electronic device according to claim 8, wherein the instructions, when executed by the processor, further enable the electronic device to determine the target terminal device based on the movement status by:

determining that the movement status of the target terminal device meets a first condition, wherein the first condition comprises, after the target terminal device is connected to the device, a distance between the target terminal device and the device presenting a change trend of decreasing first and then increasing.

20. The electronic device according to claim 8, wherein:

connection data of the target terminal device comprises a connection duration between the target terminal device and the device; and the instructions, when executed by the processor, further enable the electronic device, before disconnecting the device from the target terminal device, to determine that the connection duration meets a second condition, wherein the second condition comprises the connection duration being greater than or equal to a preset time threshold.

* * * * *